US012141378B2

(12) United States Patent
Harvey

(10) Patent No.: US 12,141,378 B2
(45) Date of Patent: Nov. 12, 2024

(54) ANGER MANAGEMENT SYSTEM

(71) Applicant: Roger Paul Harvey, Naples, FL (US)

(72) Inventor: Roger Paul Harvey, Naples, FL (US)

( * ) Notice: Subject to any disclaimer, the term of this patent is extended or adjusted under 35 U.S.C. 154(b) by 0 days.

(21) Appl. No.: 18/337,592

(22) Filed: Jun. 20, 2023

(65) Prior Publication Data

US 2024/0143094 A1    May 2, 2024

Related U.S. Application Data

(60) Provisional application No. 63/381,433, filed on Oct. 28, 2022.

(51) Int. Cl.
*G06F 3/038* (2013.01)
*G06T 11/00* (2006.01)

(52) U.S. Cl.
CPC .............. *G06F 3/038* (2013.01); *G06T 11/00* (2013.01); *G06F 2203/0383* (2013.01)

(58) Field of Classification Search
CPC ... G06F 3/038; G06F 2203/0383; G06T 11/00
See application file for complete search history.

(56) References Cited

U.S. PATENT DOCUMENTS

| | | | | |
|---|---|---|---|---|
| 11,273,367 B1 * | 3/2022 | Beckett | ................ | G06F 3/0346 |
| 2001/0031656 A1 * | 10/2001 | Marshall | ............. | G07F 17/3288 |
| | | | | 463/6 |
| 2002/0118272 A1 * | 8/2002 | Bruce-Smith | .......... | H04N 7/148 |
| | | | | 348/14.08 |
| 2005/0036509 A1 * | 2/2005 | Acharya | ............ | H04N 21/4753 |
| | | | | 370/467 |
| 2007/0105499 A1 * | 5/2007 | Ko | .................... | H04M 1/72412 |
| | | | | 455/41.2 |
| 2008/0138030 A1 * | 6/2008 | Bryan | .................... | H04N 5/445 |
| | | | | 348/E5.103 |
| 2012/0306926 A1 * | 12/2012 | Millet | .................. | G06T 3/4007 |
| | | | | 345/660 |
| 2013/0162680 A1 * | 6/2013 | Perry | .................... | G09G 5/003 |
| | | | | 345/634 |
| 2013/0303281 A1 * | 11/2013 | Argiro | ................. | A63F 13/428 |
| | | | | 463/31 |
| 2015/0100908 A1 * | 4/2015 | Magistrado | ........... | G06F 3/0484 |
| | | | | 715/766 |
| 2015/0223731 A1 * | 8/2015 | Sahin | ....................... | A61B 5/16 |
| | | | | 600/595 |
| 2015/0271113 A1 * | 9/2015 | Ahn | .................. | H04M 1/72427 |
| | | | | 709/206 |
| 2021/0344991 A1 * | 11/2021 | Todd | .................. | H04N 21/4438 |
| 2022/0038643 A1 * | 2/2022 | López Felip | ............. | G06T 7/20 |

* cited by examiner

*Primary Examiner* — Ariel A Balaoing
(74) *Attorney, Agent, or Firm* — Dunlap Bennett & Ludwig, PLLC

(57) ABSTRACT

A system for managing anger during consumption of video content. The system includes a visual display device having a display screen displaying the video content; a computer hardware configured to interrupt, on the display screen, a de-escalation content over the video content via the visual display device, wherein the computer is embodied in a dongle electrically connected to a port of the visual display device; and a handheld actuator configured to emit an anger signal that causes the computer hardware to overlay the de-escalation content, wherein the actuator is configured to detect the computer hardware is operatively associated with the visual display device, and wherein the actuator is form factored to resemble an empowering object.

10 Claims, 4 Drawing Sheets

ANGER MANAGEMENT SYSTEM

CROSS-REFERENCE TO RELATED APPLICATION

This application claims the benefit of priority of U.S. provisional application No. 63/381,433, filed 28 Oct. 2022, the contents of which are herein incorporated by reference.

BACKGROUND OF THE INVENTION

The present invention relates to training systems and, more particularly, an anger management system.

Anger management is a psycho-therapeutic program for anger prevention and control. It has been described as deploying anger successfully. Anger is frequently a result of frustration, or of feeling blocked or thwarted from something the subject feels is important. Anger can also be a defensive response to underlying fear or feelings of vulnerability or powerlessness. For better or worse, many of the above-described sources of anger are stimulated when consuming video content.

As can be seen, there is a need for an anger management method and system for selectively controlling video transmission devices when they stimulate user anger. The anger management method and system embody a handheld actuator that temporarily overlays de-escalation output via the display screen of an enabled video transmission device. The de-escalation output may be ephemeral video content that has been pre-selected by the user for its ability to sooth and/or manage their anger. The handheld actuator may take the form of an empowering object, such as a handgun, ray gun, sawed-off shotgun, or the like, that psychically or physiologically provides the user with a sense of control (over their impulsive anger).

SUMMARY OF THE INVENTION

The present invention is adapted to help individuals with anger issues when viewing anger-triggering video content as the present invention gives them a temporary off ramp to defuse their anger when the video content angers them, thereby the present invention creates a situation where the viewer can effectively react and temporarily change the video content they are watching and, ideally, train themselves to control their negative impulses on their own.

In one aspect of the present invention, a system for managing anger during consumption of a video content includes the following: a visual display device having a display screen displaying the video content; a computer hardware configured to overlay, on the display screen, a de-escalation content over the video content via the visual display device; and an actuator configured to emit an anger signal that causes the computer hardware to overlay the de-escalation content.

In another aspect of the present invention, the above system further includes wherein the actuator is configured to detect the computer hardware is operatively associated with the visual display device, wherein the actuator is form factored to resemble an empowering object, and wherein the actuator is handheld and wherein the empowering object is a gun, or wherein the actuator is a wearable object, wherein the de-escalation content is a still image, wherein the video content is a display of electronic communication, wherein the computer hardware is a dongle, and wherein the computer hardware is middleware.

In yet another aspect of the present invention, system for managing anger during consumption of a video content, the system providing the following: a visual display device having a display screen displaying the video content; a computer hardware configured to interrupt, on the display screen, a de-escalation content over the video content via the visual display device, wherein the computer is embodied in a dongle electrically connected to a port of the visual display device; and a handheld actuator configured to emit an anger signal that causes the computer hardware to overlay the de-escalation content, wherein the actuator is configured to detect the computer hardware is operatively associated with the visual display device, and wherein the actuator is form factored to resemble an empowering object.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an anger management system and method deployable when consuming video content. The video content can be a display of electronic communication, such as but not limited to emails, text messages, and the like.

Figure 1:
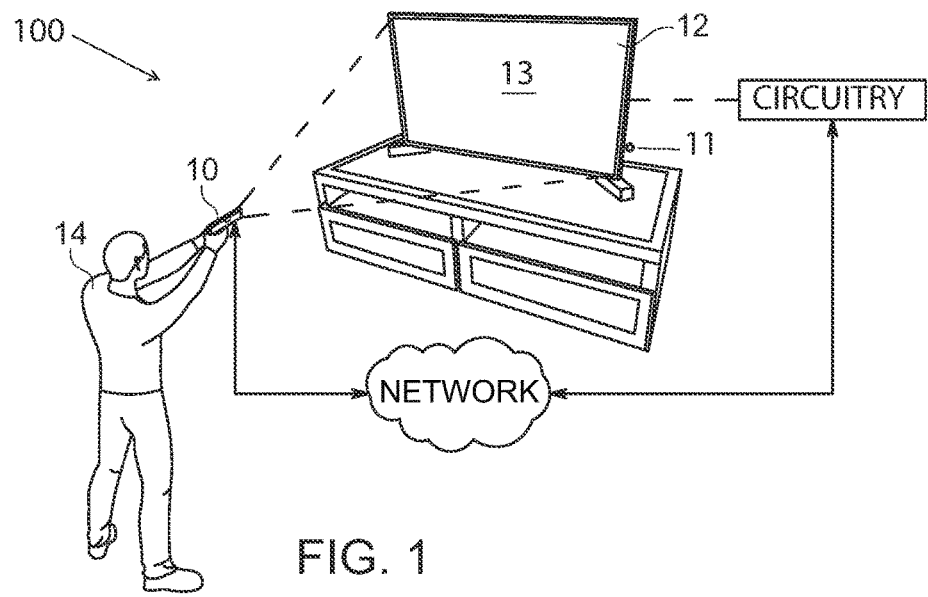
FIG. 1 a schematic view of an exemplary embodiment of the present invention.
Figure 2:
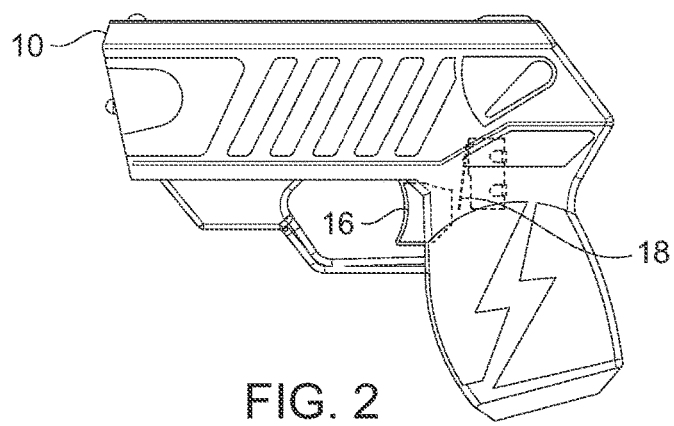
FIG. 2 is an elevation view of an exemplary embodiment of a handheld actuator of the present invention.
Figure 3:
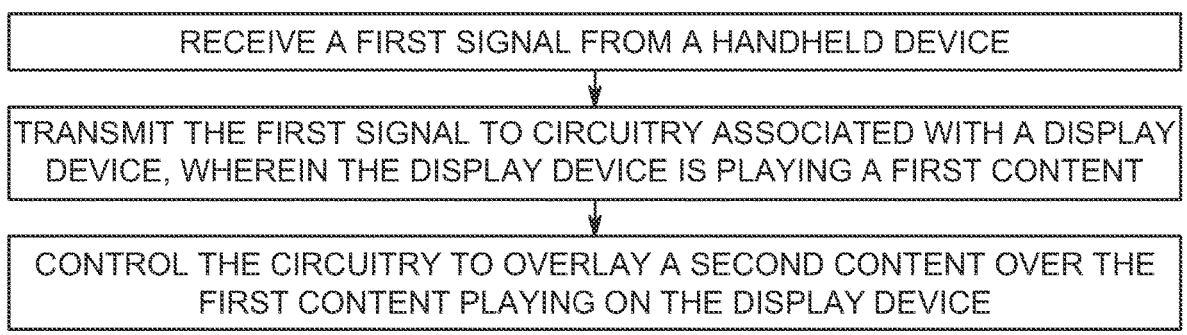
FIG. 3 is a flow chart of an exemplary embodiment of the present invention.
Figure 4:
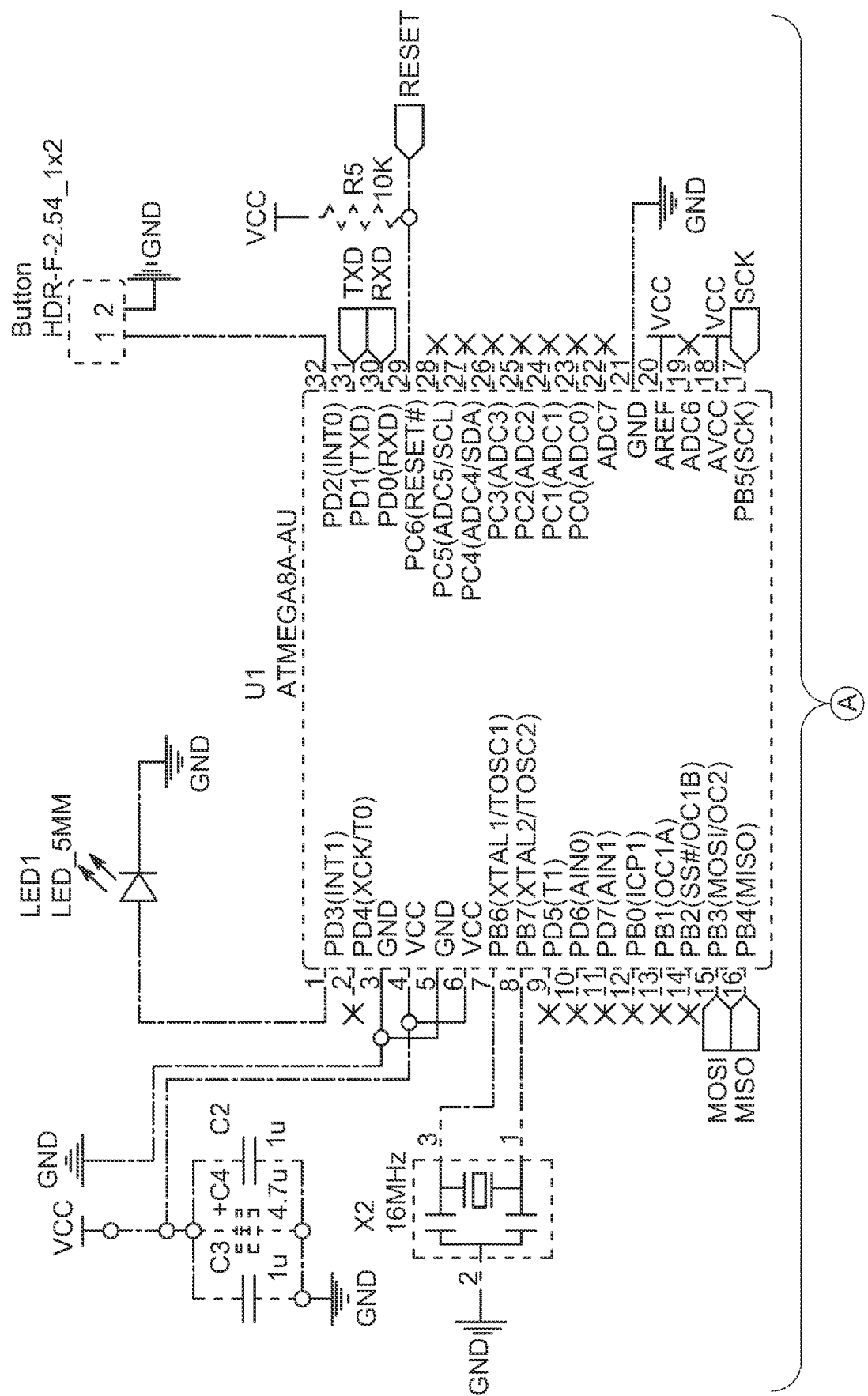
FIG. 4 is a schematic view of an exemplary embodiment of an electrical circuitry of the present invention.
Figure 4:
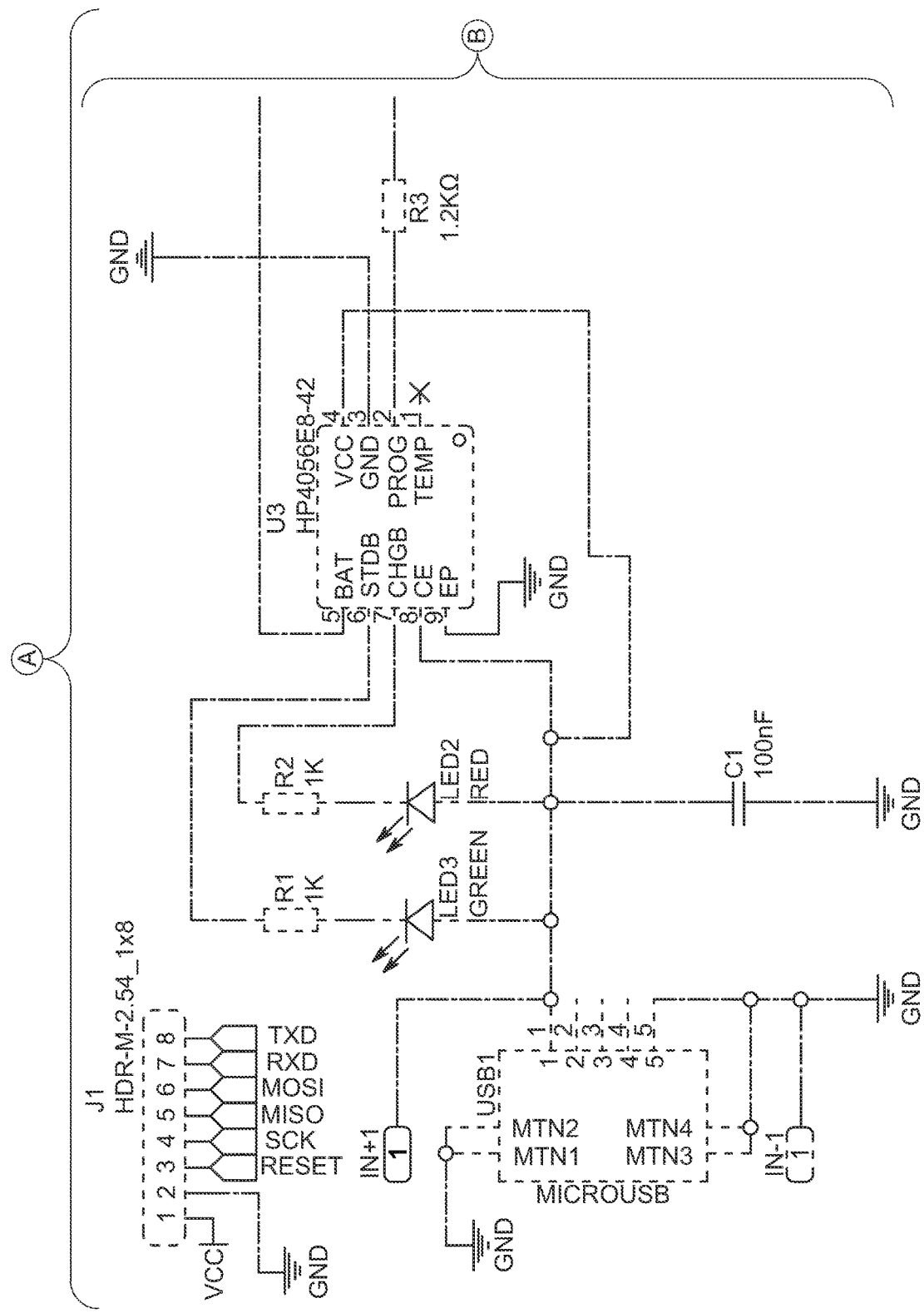
Figure 4:
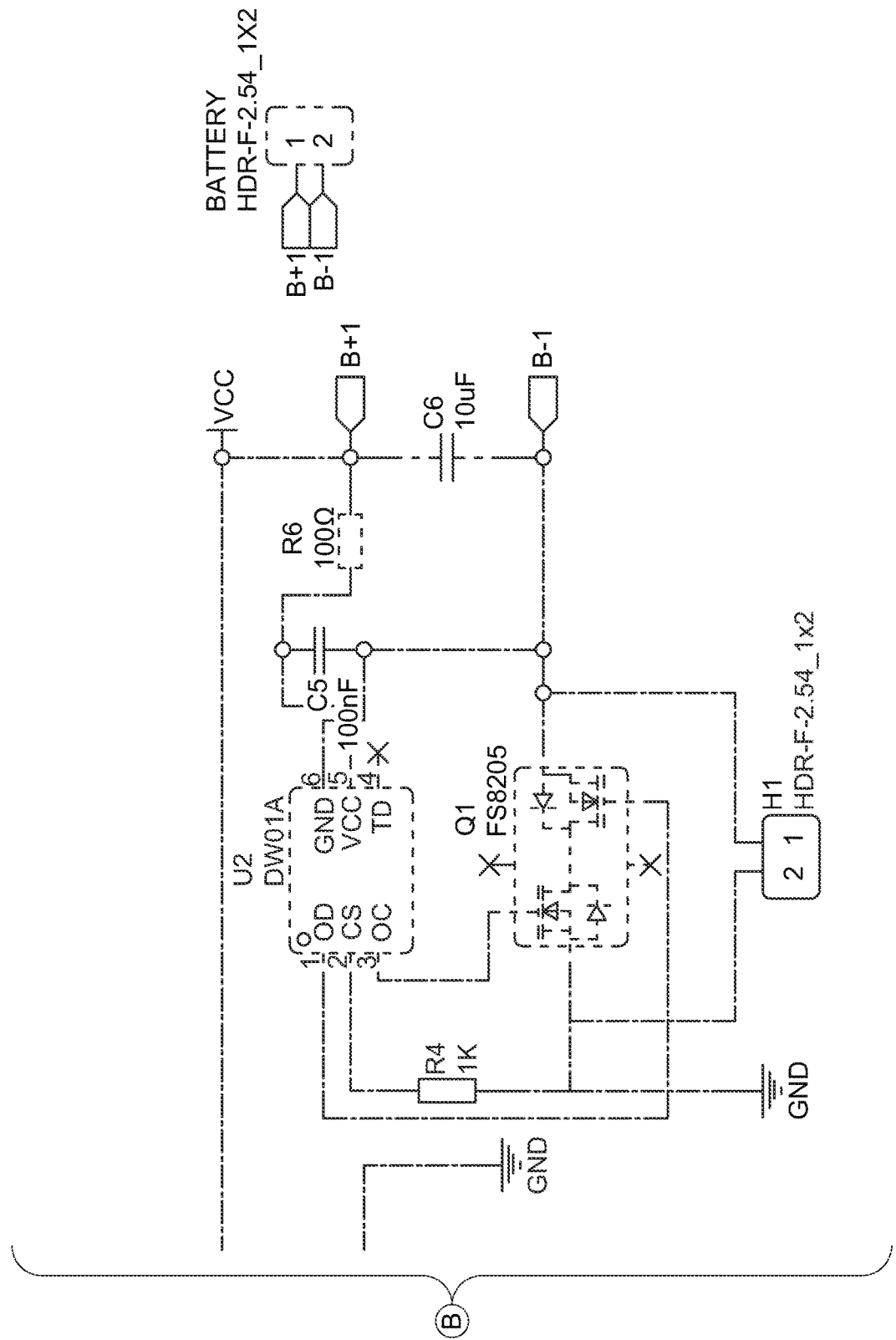

Referring now to FIGS. 1 through 4, the present invention may include an anger management system 100 comprising a chip 11 or software application for a smart video display device 12, and a handheld actuator 10 configured to activate the chip 11 or software application for the smart video display device 10. The actuator 10 may be an empowering object, such as a handgun, ray gun, sawed-off shotgun, or the like, that psychically or physiologically provides the user with a sense of control (over their impulsive anger).

The handheld actuator 10 may selectively emit (e.g., when a user pulls the trigger 16 on the gun-shaped empowering object) a signal to activate the chip 11 or software application to provide an ephemeral output of de-escalation video content. The de-escalation content may be soothing and/or calming video content preselected by the user (it may include still images or even a black screen, and it may include audio output like soothing music). The de-escalation content is broadcast by the smart video display device 10, thereby interrupting the instant video content that angered and thus prompted the user to utilize the actuator 10. The de-escalation video is activated for approximately four seconds or the like. The signal sent by the actuator 10 may be a Bluetooth™, near-field, infrared or other wireless signal that is sensed by the chip 11 and/or the software application.

A method of manufacturing the anger management system 100 may include a chip 11 or software application that interacts with the smart video display device 12, enabling the chip 11 or software application to temporarily represent/broadcast the de-escalation video output (in certain embodiments, as an overlay/remote, received transmission) on the display screen 13 of the smart video display device 12 when the user activates the handheld actuator 12.

The chip 11 may include middleware providing anger-management-related services and functionality beyond the operating system of the smart video display device 12, thereby implementing the communication and input and output functionality disclosed herein. The chip 11 may be embodied in a dongle or other computer hardware that connects to a port in the smart video display device 12.

It should be understood that the actuator 10 may take any shape (i.e., it is not limited to a gun shape), for instance the actuator 10 could take the shape of a plunger-style detonator or could be a human-shaped object that someone squeezes to activate it (analogous to a stress doll). Similarly, the actuator 10 need not be handheld—it could be a wearable adapted for any body part, such as headwear the user imparts an impact, or even a piece of furniture, for example, that the user can punch.

A method of using the present invention includes the following. The anger management system 100 disclosed above may be provided. The user activates actuator 10 to start the temporary overlayed de-escalation content on the display screen of the smart video display device 12 to elevate stress.

The term "approximately" may include deviations of up to 10 percent of a provided value.

In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, Mac-OS, Windows, Unix, OpenVMS, an operating system based on Linux, or any other appropriate operating system, including future operating systems. In some embodiments, the computing systems may be a web server running web server applications such as Apache, Microsoft's Internet Information Server™, and the like.

In particular embodiments, the computing systems include a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface may include hardware, software, or both providing one or more interfaces for communication between a person and the computer systems. As an example, and not by way of limitation, a user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface.

The communication interface includes hardware, software, or both providing one or more interfaces for communication (e.g., packet-based communication) between the computing systems over the network. As an example, and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A system for training a user to self-control anger during consumption of a video content, the system comprising:
    a visual display device having a display screen displaying a broadcast of the video content;
    an external hardware electrically connected to an input port of the visual display device, wherein the external hardware has middleware that is configured to execute an interrupt of said broadcast of the video content without interfering with an operating system of the visual display device, wherein the external hardware is configured to broadcast, by way of the input port, a de-escalation content via the visual display device, wherein the de-escalation content is preselected by the user to be calming to the user; and
    an actuator form factored to provide the user with a sense of control, the actuator configured to emit an anger signal that causes the external hardware to interrupt the broadcast of the video content and broadcast the de-escalation content, whereby the entire video content is interrupted selectively by the user.

2. The system of claim 1, wherein the actuator is configured to detect when the computer hardware is operatively associated with the visual display device.

3. The system of claim 1, wherein the actuator is form factored to resemble an empowering object, and wherein the actuator is handheld.

4. The system of claim 3, wherein the empowering object is a gun.

5. The system of claim 1, wherein the actuator is a wearable object.

6. The system of claim 1, wherein the de-escalation content is a still image.

7. The system of claim 1, wherein the video content is a display of electronic communication.

8. The system of claim 1, wherein the computer hardware is a dongle.

9. The system of claim 1, wherein the video content is interrupted for approximately four seconds.

10. A system for training a user to self-control anger during consumption of a video content, the system comprising:
    a visual display device having a display screen displaying the video content;
    a dongle electrically connected to an input port of the visual display device, wherein the dongle is configured to execute an interrupt of said broadcast of the video content, without interfering with an operating system of the visual display device, wherein the dongle is further configured to broadcast, by way of the input port, a de-escalation content via the visual display device, wherein the de-escalation content is preselected by the user to be calming to the user; and
    a handheld actuator configured to emit an anger signal that causes the computer hardware to overlay the de-escalation content, wherein the actuator is configured to detect the computer hardware is operatively associated with the visual display device, and wherein the actuator is form factored to resemble an empowering object and so provide the user with a sense of control.

* * * * *